United States Patent
Edwards

(10) Patent No.: US 10,445,530 B1
(45) Date of Patent: Oct. 15, 2019

(54) HARDWARE INTRUSION DETECTION SYSTEM

(71) Applicant: National Technology & Engineering Solutions of Sandia, LLC, Albuquerque, NM (US)

(72) Inventor: Nathan J. Edwards, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 644 days.

(21) Appl. No.: 13/834,673

(22) Filed: Mar. 15, 2013

Related U.S. Application Data

(60) Provisional application No. 61/674,716, filed on Jul. 23, 2012.

(51) Int. Cl.
*G06F 21/76* (2013.01)

(52) U.S. Cl.
CPC .................... *G06F 21/76* (2013.01)

(58) Field of Classification Search
CPC .......... G06F 21/70; G06F 21/71; G06F 21/76; G06F 21/86; G06F 21/55; G06F 2221/2103; G06F 21/44; H04L 9/3271
See application file for complete search history.

(56) References Cited

U.S. PATENT DOCUMENTS

| | | | | |
|---|---|---|---|---|
| 2002/0199111 A1* | 12/2002 | Clark | ................... | G06F 21/87 713/194 |
| 2004/0255162 A1 | 12/2004 | Kim et al. | | |
| 2007/0170931 A1* | 7/2007 | Snyder | ............... | G01R 27/2605 324/658 |
| 2008/0276111 A1* | 11/2008 | Jacoby et al. | ................ | 713/340 |
| 2013/0104252 A1* | 4/2013 | Yanamadala et al. | .......... | 726/34 |
| 2013/0318607 A1* | 11/2013 | Reed | ................... | G06F 11/3062 726/23 |

FOREIGN PATENT DOCUMENTS

EP  2 544 157 A1  1/2013

OTHER PUBLICATIONS

Carlos R. Aguayo Gonzalez and Jeffrey H. Reed, "Detecting Unauthorized Software Execution in SDR Using Power Fingerprinting", 2010, pp. 2211-2216, obtained from IEEE.*
Carlock, G. W., "The Two-Stage RC Low-Pass Matched Filter," IEEE Transactions on Communications, vol. COM-20, No. 1, Feb. 1972, pp. 73-74.

* cited by examiner

*Primary Examiner* — Jeffrey D. Popham
(74) *Attorney, Agent, or Firm* — Madelynne J. Farber

(57) ABSTRACT

An apparatus for intrusion detection includes processing circuitry, a switch, signal detection circuitry, and an analog-to-digital converter ("ADC"). The processing circuitry is coupled to send a challenge signal to a device when the device is coupled to the processing circuitry. The switch is coupled to be enabled and disabled by the processing circuitry. The switch is for coupling to the device to receive a response signal in response to the challenge signal sent by the processing circuitry. The signal detection circuitry is coupled to receive the response signal in via the switch, when the processing circuitry enables the switch. The ADC is coupled to take measurements of the signal detection circuitry at a first output. The processing circuitry is coupled to the ADC and configured to analyze whether an intruder is present in the device based on the measurements of the signal detection circuitry.

12 Claims, 8 Drawing Sheets

HARDWARE IDS USING RESISTIVE-CAPACITIVE CIRCUITS

| Type of Measurement | Name | Units | Description |
|---|---|---|---|
| Discrete Components | "Cap" | Farad | Nominal capacitance of C1 & C2 on the IDS module. |
| | "Res" | Ohm | Nominal resistance of R1 & R2 on the IDS module. |
| Voltage Measurements | "V1pk" | V | Peak voltage of C1 during a measurement cycle. |
| | "V2pk" | V | Peak voltage of C2 during a measurement cycle. |
| Time Measurements | "V1pkToIDSoff" | second | Time difference between peak voltage of C1 and the transition edge from charge cycle to discharge cycle (as monitored by the analog switch's control signal). |
| | "V2pkToIDSoff" | second | Same as "V1pkToIDSoff" except using C2 peak voltage. |
| Interval Slopes (first derivative) | "SDslopeV1_OnOff" | V/10µs | Standard deviation on the difference between interval slope $i$ of the charge cycle and the transform of interval slope $i$ of the discharge cycle. Interval slopes are acquired with a 300kHz sampling rate. |
| | "SDslopeV2_OnOff" | V/10µs | Same as "SDslopeV1_OnOff" except using C2 voltage-time measurements. |
| | "SlopeV1qty" | integer | Count of the number of interval slopes less than a predetermined threshold (initial threshold set to 0) |
| | "SlopeV2qty" | integer | Same as "SlopeV1qty" except using C2 interval slopes. |
| Area Under Curves (integral function) | "AreaV1on" | V·s | Area under the curve during capacitor C1 charge cycle |
| | "AreaV2on" | V·s | Area under the curve during capacitor C2 charge cycle |
| | "AreaV1V2on" | V·s | Difference between the area under curves V1 and V2 during the charge cycle. |
| | "AreaV1off" | V·s | Area under the curve during capacitor C1 discharge cycle |
| | "AreaV2off" | V·s | Area under the curve during capacitor C2 discharge cycle |
| | "AreaV1V2off" | V·s | Difference between the area under curves V1 and V2 during the discharge cycle. |
| | "AreaV1V2_OnOff" | V·s | Difference between "AreaV1V2on" and "AreaV2off" |
| | "AreaV1_OnOff" | V·s | Difference between "AreaV1on" and "AreaV1off" |
| | "AreaV2_OnOff" | V·s | Difference between "AreaV2on" and "AreaV2off" |

FIG. 7

HARDWARE INTRUSION DETECTION SYSTEM

CROSS REFERENCE TO RELATED APPLICATIONS

This application claims priority under the provisions of 35 U.S.C. § 119(e) to U.S. Provisional Application No. 61/674,716 filed on Jul. 23, 2012.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to communication security, and in particular but not exclusively, relates to detecting security threats in embedded systems.

BACKGROUND INFORMATION

Many embedded system devices, especially those used in critical infrastructure applications, are easily accessible (i.e. have poor physical security) and can be tampered with or altered such that the integrity and authenticity of the devices cannot be assured. Once the device is sold or deployed, malicious circuitry (aka intruder) may be installed by an adversary. The intruder may be installed to be coupled to a communication bus and include circuitry to read or control the communication bus. Information or protocols of the communication bus may be learned by the intruder and subsequently be delivered to the adversary. Given the possibility of an intruder being installed on a device that requires security, it would be desirable to be able to detect an intruder installed on a device and take action based on detecting the intruder.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7 illustrates an example table of measurements and calculations that may be utilized to detect an intrusion on a device, in accordance with an embodiment of the disclosure.

DETAILED DESCRIPTION

Embodiments of an apparatus and method for detecting intrusions on a hardware device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
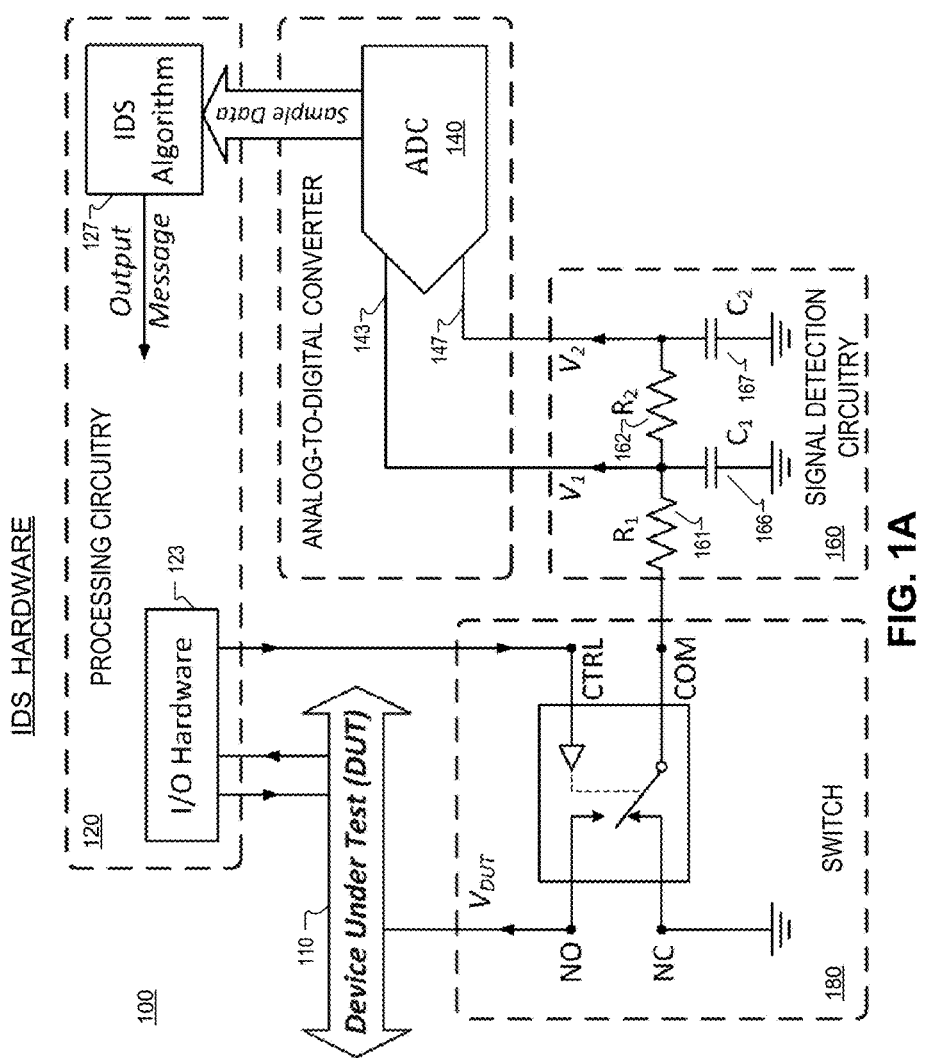
FIGS. 1A and 1B illustrate examples of Intrusion Detection System ("IDS") Hardware for coupling to a device for detecting possible security threats, in accordance with an embodiment of the disclosure.
Figure 1B:
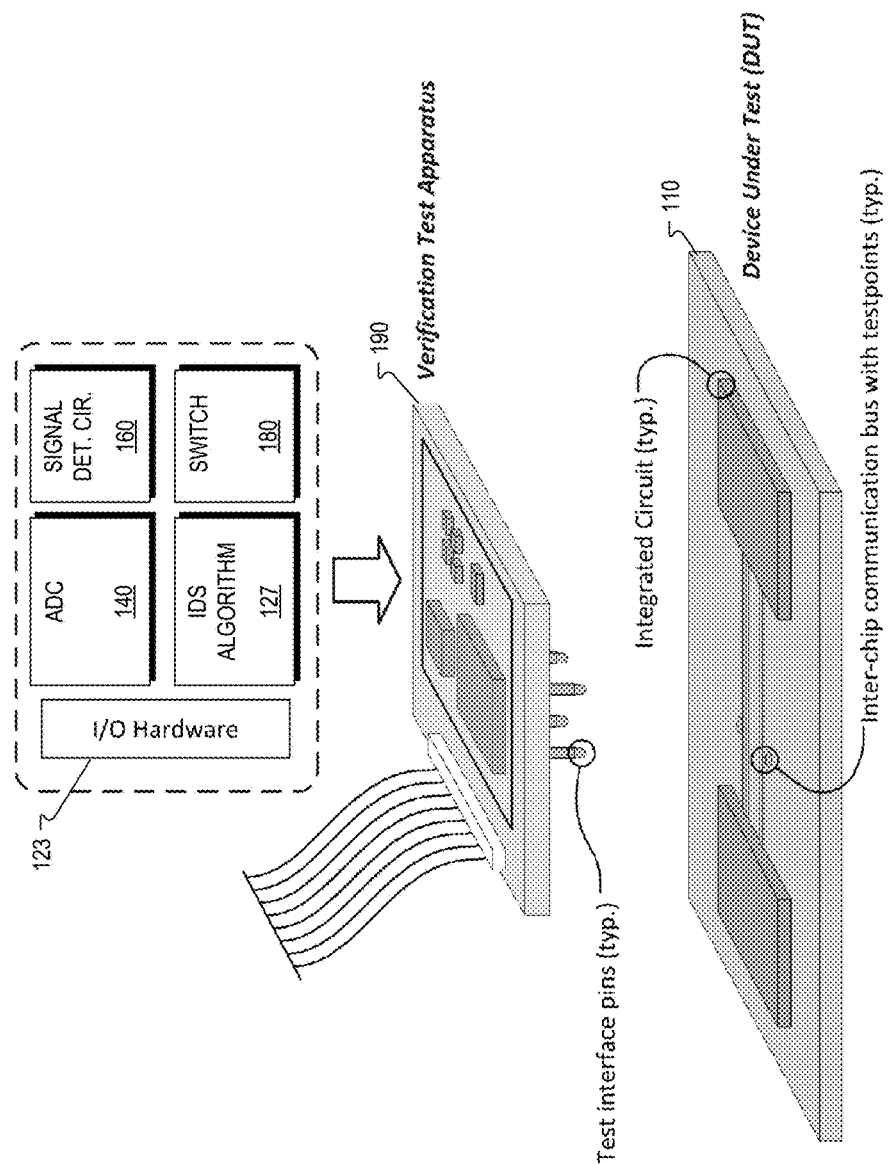

FIGS. 1A and 1B illustrate examples of Intrusion Detection System ("IDS") Hardware for coupling to a device for detecting possible security threats, in accordance with an embodiment of the disclosure. FIG. 1A includes IDS hardware 100 that includes processing circuitry 120, an analog-to-digital converter ("ADC") 140, signal detection circuitry 160, and a switch 180. In FIG. 1A, IDS hardware 100 is coupled to Device Under Test ("DUT") 110. IDS hardware 100 is configured to discern whether an intruder is present on DUT 110.

A circuit board level intruder on DUT 110 will likely require some power supply along with an external communication interface (which could be wireless) to report back to an adversary. The circuit board level intruder may also have the ability to sense and modify communication on an embedded device platform on DUT 110. Without these characteristics, the intruder may be of limited use to the adversary. An adversary may want to monitor inter-chip communication using a ubiquitous protocol such as Inter-Integrated Chip ("I²C") or Serial Peripheral Interface ("SPI") or access data through existing integrated circuit ("IC") interfaces. It is well known that the transistor level hardware to support these communication protocols and many other IC interfaces can be modeled with a capacitance element and a resistive load.

IDS hardware 100 is primarily centered on the concept of challenge-response authentication which is prevalent in modern trusted computing systems. As an overview of the concept, a verifier can send a challenge (signal) to the DUT and the system should respond correctly within an appropriate tolerance. Many of the computer security applications that use the challenge-response concept focus on digital responses or cryptographic functions.

In contrast, the embodiments of apparatuses, systems, and methods of this disclosure use an approach for intrusion detection on embedded system devices that can induce a challenge on the physical properties of an embedded system (DUT 110) along with principles of energy conservation. IDS hardware 100 then measures electrical characteristics of a system's (e.g. an embedded system of DUT 110) dynamic power response. Energy of the system's dynamic response (DUT 110) to a binary challenge (e.g. single-bit or multi-bit square wave) is transferred to signal detection circuitry 160 facilitated by switch 180 connecting the signal detection circuitry to the DUT followed by a disconnect. The dynamic response on signal detection circuitry 160 may be measured and analyzed for the possibility of an intruder on DUT 110. As a high-level example, the response of signal detection circuitry 160 to a given challenge may be compared to past responses of the signal detection circuitry 160 to the same challenge signal. Statistical perturbations to the waveform may indicate that an intruder is present within DUT 110.

In FIG. 1A, processing circuitry 120 is coupled to DUT 110. FIG. 1B shows that in one embodiment, IDS hardware 100 is included in a verification test apparatus 190 and that verification test apparatus 190 may include test interface pins coupled to a DUT 110. DUT 110 may include testpoints that are configured to accept the test interface pins. The testpoints on DUT 110 may make an inter-chip communication bus accessible to the verification test apparatus. Although an inter-chip communication bus is illustrated as a possible access point, the concepts of this intrusion detection system can be applied to other low-power electronic device subsystems, in order to detect intruders on those subsystems. For example, the testpoints may be connected to input/output ("I/O") pins of integrated circuits, power traces, or other conductors in the system.

Referring back to FIG. 1A, processing circuitry 120 includes I/O hardware 123 and includes algorithm logic 127 to perform an IDS algorithm. Processing circuitry 120 may include a processor, a Field Programmable Gate Array ("FPGA"), or other logic circuitry. Processing circuitry 120 may include memory suitable for storing data. Processing circuitry 120 is coupled to send a challenge signal to DUT 110. The challenge signal may be sent using I/O hardware 123. The challenge signal may be sent to a communication bus onboard DUT 110 or other nodes of the embedded system.

A response to the challenge is received by switch 180. In FIG. 1A, switch 180 is coupled to receive a response signal from DUT 110 in response to the challenge signal sent by processing circuitry 120. Switch 180 may be coupled to a communication bus of DUT 110 that receives the challenge signal from processing circuitry 120. Processing circuitry 120 is coupled to control switch 180 to coordinate enabling and disabling switch 180 with sending the challenge signal to DUT 110. In FIG. 1, switch 180 is illustrated as a single-pole double-throw ("SPDT") low-resistance analog switch, which may be controlled by a pin of a microprocessor included in processing circuitry 120. Switch 180 may be an audio quality switch that has low charge injection and low total harmonic distortion ("THD") which can allow (response) signals from the DUT 110 to propagate through switch 180 with minimal signal loss.

Signal detection circuitry 160 is coupled to receive the response signal from switch 180 when processing circuitry 120 enables switch 180. When processing circuitry 120 enables switch 180, switch 180 connects the COM node and the NO node, in the illustrated embodiment. When processing circuitry 120 disables switch 180, switch 180 connects the COM node and the NC node, in the illustrated embodiment.

In FIG. 1A, signal detection circuitry 160 includes a two-stage resistive-capacitive ("RC") filter. In the illustrated embodiment, the first stage of the two-stage RC filter includes a first resistor R1 161 and a first capacitor C1 166. The second stage of the two-stage RC filter includes a second resistor R2 162 and a second capacitor C1 167. A first output of the two-stage filter is coupled to the first stage of the two-stage filter and a second output of the two-stage filter is coupled to the second stage of the two-stage filter. In one embodiment, R1 161 and R2 162 are each 84.5 kohms. In one embodiment, both C1 166 and C2 167 are each 10 picoFarads. It is appreciated that the illustrated embodiment is one example of signal detection circuitry 160 and that other single or dual (or more) outputs may be included in signal detection circuitry 160, in accordance with the scope of this disclosure.

ADC 140 is coupled to take measurements of the signal detection circuitry 160 at an output of the signal detection circuitry 160. ADC 140 may be on-board a microprocessor included in processing circuitry 120 or it may be a separate device controlled by processing circuitry 120. In the illustrated embodiment, ADC 140 is coupled to take measurements of the signal detection circuitry 160 at two outputs of the signal detection circuitry 160 and other embodiments include ADC 140 measuring more than two outputs of signal detection circuitry 160. Processing circuitry 120 may be coupled to control operation (e.g. initiating ADC conversions and controlling sampling periods) of ADC 140. Processing circuit 120 may control ADC 140 to sample the outputs of signal detection circuitry 160 while signal detection circuitry 160 is receiving the response signal from DUT 110. Processing logic 120 is coupled to receive sample data from ADC 140 and the sample data includes measurements of signal detection circuitry 160.

Normally an intruder actively using a device such as DUT 110 (i.e. an "active attack"), will source energy (pull-up the voltage potential to VDD) or sink energy (pull-down the voltage potential close to 0) which results in a square wave that is then decoded by target devices as a binary 1 or 0. By using an appropriately sized two-stage resistor-capacitor filter circuit we are able to slow down the voltage response caused by an intruder so that the square wave becomes a gradual curve with an exponential decay term determined by the time constant of the RC circuit, for example. This can exaggerate any signal perturbations and can allow several electrical characteristics and intrusion detection metrics to be more easily measured.

Due to the nature of a two-stage filter circuit, signal perturbations can be filtered by the first capacitor which can dampen the effect prior to the second capacitor. What this means for intrusion detection is that if a signal perturbation is detected while monitoring the second capacitor, the cause of the perturbation will have significant energy transfer capabilities such as a hardware intruder attempting to use the device or subsystem rather than system noise (which is normally filtered out). In other words this IDS circuit can help reduce false positives.

Processing circuitry includes algorithm logic 127 configured to perform an intrusion detection algorithm. The intrusion detection algorithm analyzes the measurements of the signal detection circuitry to determine whether there is an intruder on DUT 110 and outputs the determination of whether there is an intruder on DUT 110. The determination may be reported to an external utility by processing circuitry 120.

Figure 2:
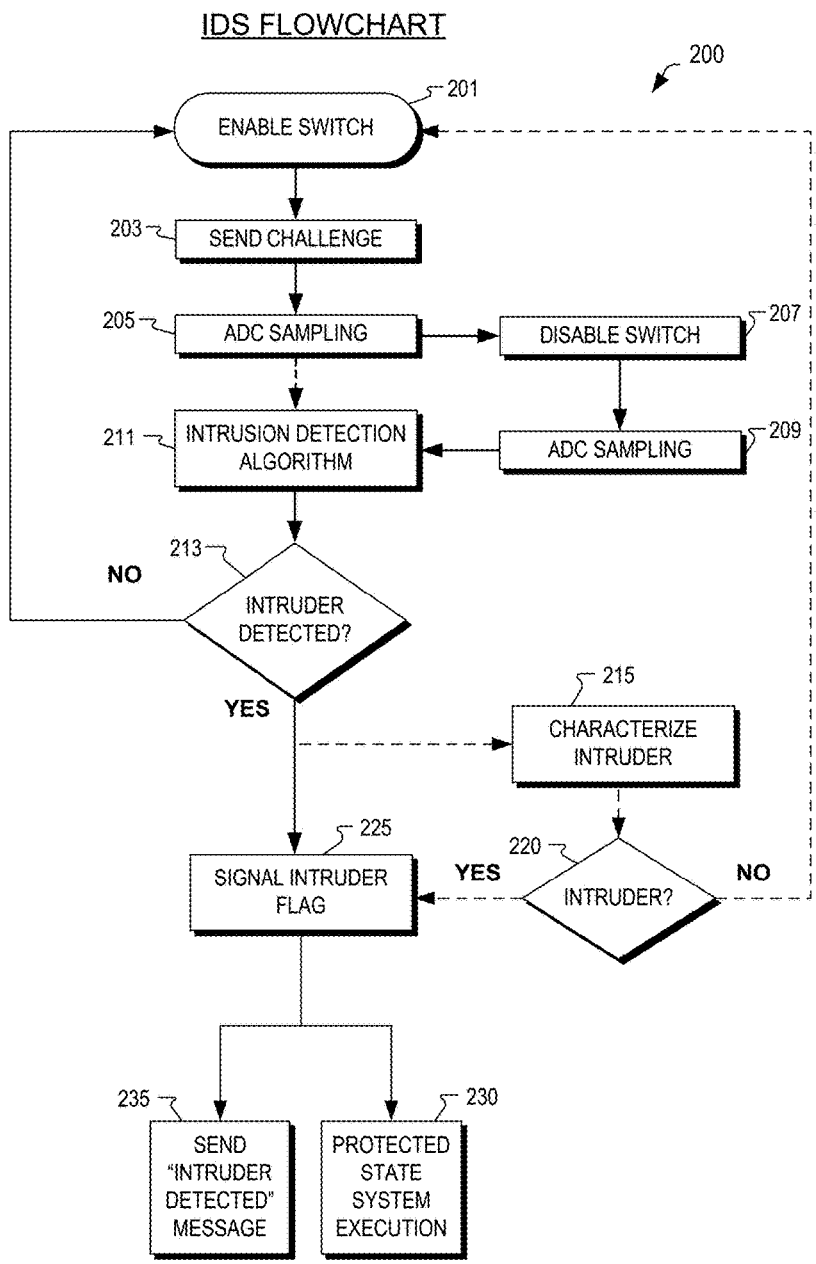
FIG. 2 shows a flowchart illustrating an example process of detecting an intrusion on a device, in accordance with an embodiment of the disclosure.

FIG. 2 shows a flowchart illustrating an example process 200 of detecting an intrusion on a device, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In process block 201, a switch is enabled. In process block 203, a challenge is sent by an intrusion detection apparatus (e.g. IDS hardware 100) to a DUT (e.g. DUT 110). The challenge may be a binary challenge that is a single-bit or a multi-bit square wave. The switch is enabled in process block 201 to facilitate transferring a response signal to signal detection circuitry (e.g. signal detection circuitry 160). The response signal is generated by the DUT in response to the challenge signal sent by the intrusion detection apparatus. The signal detection circuitry can receive the response signal, give a dynamic response to the challenges, and that dynamic response can be measured and analyzed.

In process block 205, an ADC samples at least one output of the signal detection circuitry. The output could be a voltage, current or a flux measurement. In FIG. 1A, ADC 140 samples voltages V1 and V2 at two different outputs of signal detection circuitry 160 as the signal detection circuitry 160 receives the response signal. The voltage measurement or series of voltage measurements over a time period may be referred to as response measurements. The sampling rate of the ADC must be fast enough to capture different metrics without decreasing the performance of the intrusion detection model. In one embodiment, the sampling rate is 50 MHz. The ADC can be low resolution (e.g. 8-bit), or higher resolution (10-bit, 12-bit, etc.) as along as it will offer sampling rate performance that meet the minimum requirements for the metrics that a given detection model requires.

After process block 205, process 200 may continue on to process block 211 for analyzing the response measurements from the signal detection circuitry to determine whether an intruder may be present on the DUT. Process 200 may also continue to process block 207. At process block 207, processing circuitry disables the switch. In FIG. 1A, disabling switch 180 discharges capacitors C1 166 and C2 167 as the NC node is connected to ground. In process block 209, the ADC samples the signal detection circuitry. In FIG. 1A, disabling switch 180 discharges C1 166 and C2 167, and ADC 140 may sample output V1 and V2 while C1 166 and C2 167 discharge. In process block 205, response measurements are gathered while C1 166 and C2 167 charge, while in process block 209, response measurements are gathered while C1 166 and C2 167 discharge. Having the response measurements for both charging and discharging may assist or give more certainty to the intrusion detection algorithm in process block 211. It is understood that process 200 may perform process blocks 207 and 211 in parallel. In other words, process 200 may be analyzing the charging response measurements while processing circuitry gathers discharging response measurements.

Describing process blocks 201-211 in the specific context of FIG. 1A, switch 180 can connect the RC circuit to DUT 110, allowing the capacitors to charge at a rate determined by the time constant τ (tau) where, (1) τ=R*C=(equivalent resistance)*(equivalent capacitance).

The voltage outputs of the illustrated signal detection circuitry 160 (V1 and V2) can be monitored (sampled) while capacitors C1 166 and C2 167 are charging. The response signals measured while the capacitors are charging can then be compared to previous response signals measured by the capacitors in response to the same challenge signal. Alternatively, or in addition, the charging response signals can be compared to discharging response signals measured when switch 180 is disabled (and as a result, connects signal detection circuitry 160 to ground—discharging the capacitors). In the disconnected state (switch is disabled) the capacitors will discharge with a natural exponential decay response. Due to well understood physical properties of an RC circuit and by selecting a balanced design where R1=R2 and C1=C2, the charge and discharge cycles without an intruder can have similar rates of decay (which can be shown with a simple linear transformation of the signal about the horizontal axis). It is expected that the per-cycle (charge-discharge cycle) comparisons along with a sliding window comparison of the previous n-cycles will indicate any significant signal perturbations caused by a hardware intruder.

Both channels of the ADC can be used to monitor and capture the voltage-time data of the capacitors in the RC circuit of signal detection circuitry 160, from which a number of metrics both measured and derived can be used to indicate the presence of an intruder. Some measurements can be voltage or time data, others can include first derivative functions (interval slopes) or integral functions (areas under the curve). In addition, some of the metrics used can be simple incremental counts.

FIG. 7 illustrates an example table of measurements, calculations, and metrics (not all inclusive) that may be utilized to detect an intrusion on a device, in accordance with an embodiment of the disclosure. As examples, FIG. 7 includes metrics for comparing the slopes of the measured waveforms (derivative function) and/or comparing the areas under the curves of measured waveforms (integral function) as possible metrics for determining whether an intruder is present in DUT 110. One or more of these calculations or metrics may be calculated and compared as part of the intrusion detection algorithm, in process block 211. The intrusion detection algorithm can reside on one of the system's microprocessors and can use the voltage-time data from the two channel ADC module to detect a hardware intruder.

After process block 211, process 200 continues to process block 213. If no intruder has been detected by the intrusion detection algorithm, process 200 returns to process block 201. If an intruder has been detected by the intrusion detection algorithm, process bock continues to process block 225. In process block 225, an intruder flag is raised (which may include writing a register or global memory location) and can inform other components in an embedded system, such as other on-board microprocessors or software services, through a simple message passing interface (serial, parallel, or internal interface).

Optionally, once an intruder is initially detected in process block 213, process 200 may continue to process block 215 for additional processing to further characterize an intruder. In some cases, a reduced algorithm may be run to identify the presence of an intruder (e.g. process block 211), then a more complicated algorithm may be run to characterize the intruder for attribution (e.g. process block 215), or to verify a false positive (if, for example, the specificity of the system is tuned to allow more false positives while reducing false negatives). If an intruder is still detected after the more complicated algorithm in process block 215, process block continues to process block 225. If after the more complicated algorithm it is determined that there is not an intruder present, process block 200 may return to process block 201.

After an intruder flag is raised in process block 225, process 200 may continue to process block 235 and/or process block 230. If the embedded system (e.g. IDS hardware 100 is networked, a message indicating a hardware intruder may be propagated through the network interface (wired or radio) and can inform the system's operator of a cyber-event.

In addition to (or as an alternative to) alerting a network utility, firmware or software running on an embedded system may be configured to only allow execution of a minimal set of operations on the device like sampling and transmitting sensor data, in process block 235. In this reduced or protected state, operations like firmware upgrades, encryption key updates, or device enrollment in the network may not be allowed to execute.

As illustrated in FIG. 1A, IDS hardware 100 may be added to embedded systems that are put into use in the field. This built-in option can offer the benefit of intrusion detection during functional verification testing as well as ongoing intrusion detection after the device has been deployed in the field. By using Bayesian techniques, the intrusion detection model can also be automatically tuned to the device's operating environment or may stay consistent with the degradation from device aging, both of which change the electrical characteristics of analog components. The decision to use any of the built-in configurations shown in FIGS. 3-6 (discussed below) can be weighed against the risks of exposed interfaces that could be bypassed. For example, the configuration shown in FIG. 4 might be vulnerable to physical tampering. However, circuit board potting, physical perimeter security surrounding the device, etc. may mitigate the risk of physical attack on the IDS hardware. Although incorporating the IDS technology into the device design may have a slightly larger physical layout space requirement, it ultimately can help address upstream supply chain risks and also can provide a longer term solution to the hardware intruder problem.

Additionally those skilled in the art understand that IDS hardware 100 may be used as an external IDS to test devices before they are deployed. In one use case this IDS technology can be used to build an external IDS circuit and create the accompanying test routine which can become part of the functional verification testing at the device manufacturing facility. FIG. 1B illustrates this use case. Although this scheme may not provide on-going integrity checks of the device, it can be useful to help reduce supply chain risk with minimal cost to a manufacturing system. The IDS technology could reside on the manufacturer's benchtest apparatus rather than as part of the embedded system device, and thus could eliminate a significant cost of engineering design change-orders for the actual device. IDS hardware 100 may be used in a secure manufacturing environment to make initial measurements of characteristics of embedded systems and then store those initial measurements for later use. IDS hardware 100 (or a substantially identical hardware apparatus) may then test devices that have been in the field at some point in the future to determine whether an intruder is present on the device. The IDS hardware 100 may compare the response measurements with the initial response measurements stored at the time of secure manufacturing to determine whether an intruder is present. Another potential benefit to this modality of intrusion detection is that it can be combined with other off-line hardware intruder detection techniques like side-channel analysis to provide a full suite of risk reducing supply-chain security mitigations.

Figure 3:
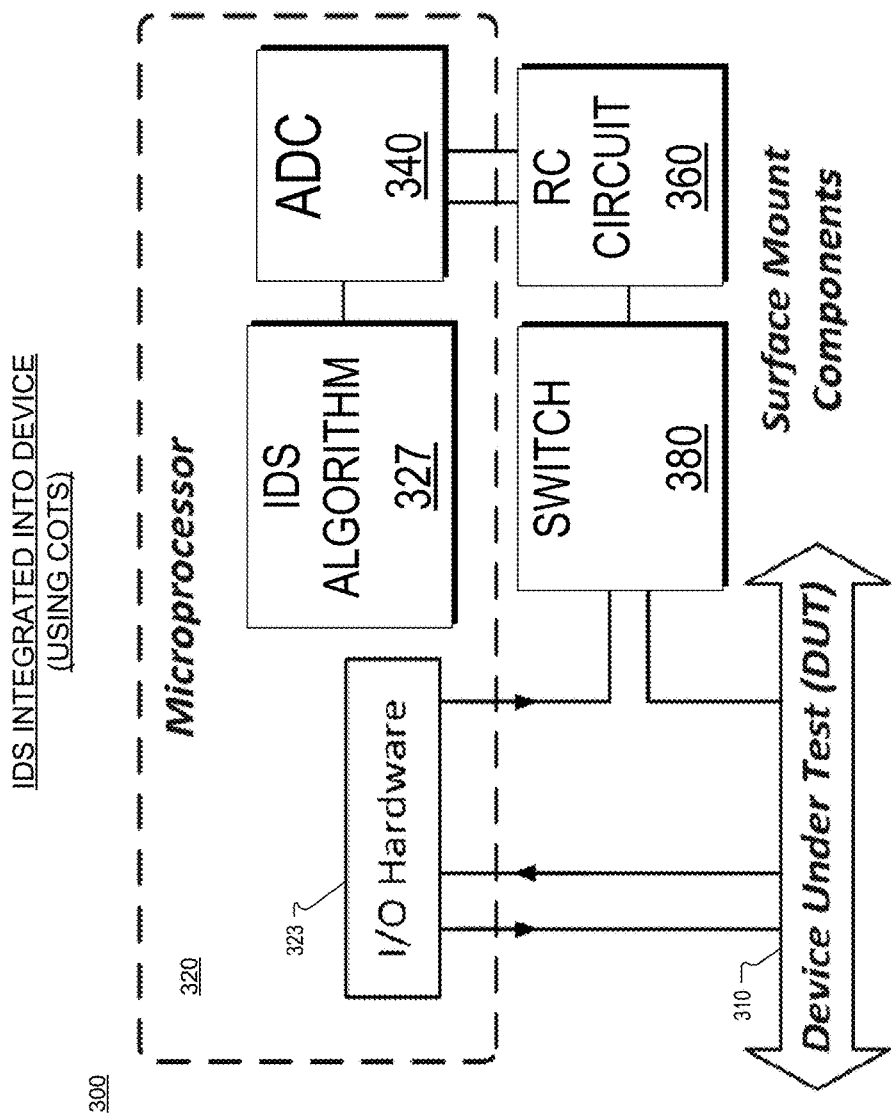
FIG. 3 illustrates an example IDS that includes using Commercial Off-The-Shelf ("COTS") surface mount components, in accordance with an embodiment of the disclosure.

FIG. 3 illustrates an example embodiment of an IDS hardware 300 that includes using Commercial Off-The-Shelf ("COTS") surface mount components, in accordance with an embodiment of the disclosure. FIG. 3 includes a microprocessor 320 that includes I/O hardware 323, algorithm logic 327, and an ADC 340. ADC 340 is coupled an RC circuit 360 that is made from discrete, surface mount components. Switch 380 is also a surface mount component. ADC 340 is coupled to RC circuit 360 that is coupled to receive a response signal from DUT 310 when I/O hardware 323 enables an analog switch 380. RC circuit 360 may be the same or similar as the RC circuit described within signal detection circuitry 160. Analog switch 380 may be the same or similar as switch 180.

From a systems perspective, the integration of the RC-circuit based IDS hardware 300 is well suited for existing embedded device designs. Most microprocessors that can be used for embedded systems are commercially available components with many general purpose I/O functions, one of which can be ADC peripheral hardware. In addition the footprint of the other components (resistors, capacitors, and analog switch) can have minimal space requirements on a printed circuit board.

Figure 4:
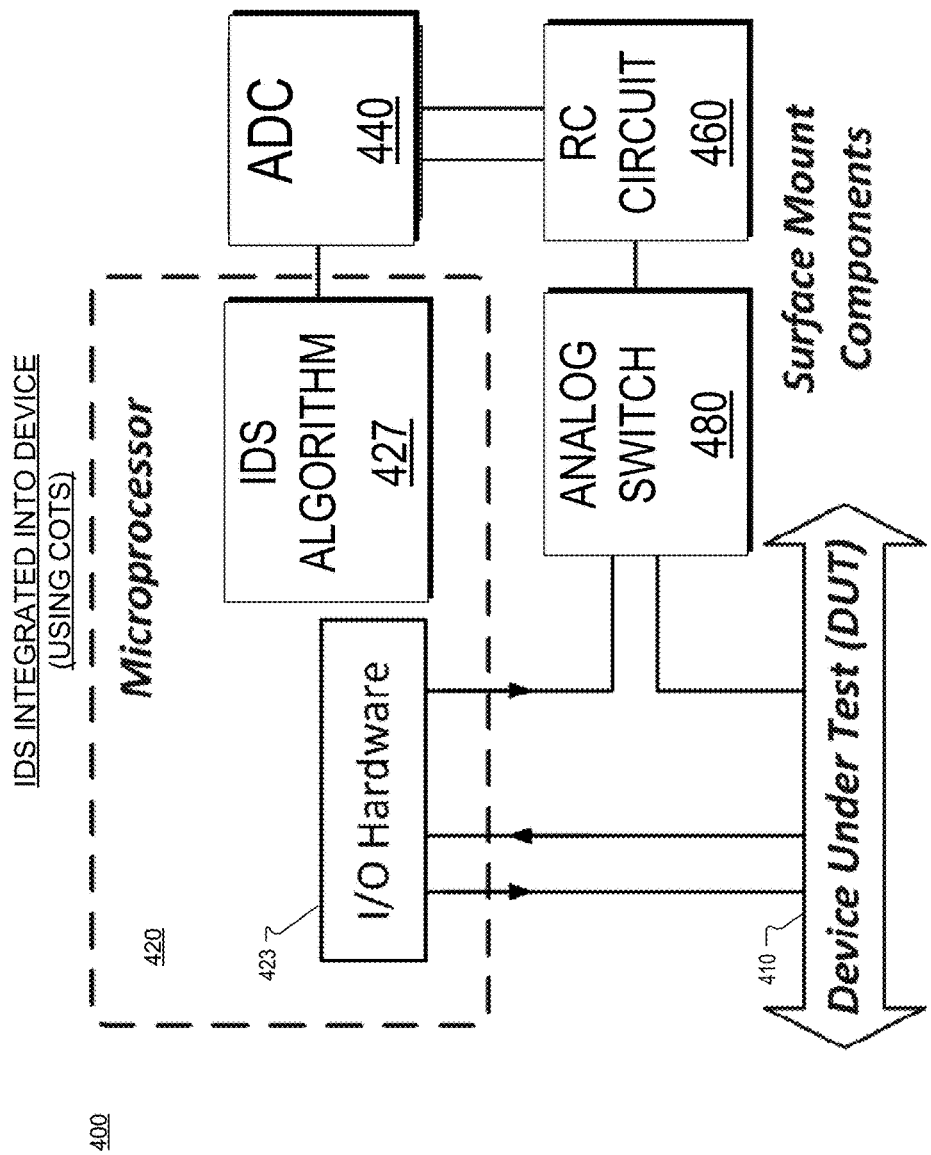
FIG. 4 illustrates an example IDS that includes using COTS surface mount components including an analog-to-digital converter ("ADC") that is separate from a microprocessor, in accordance with an embodiment of the disclosure.

FIG. 4 illustrates another embodiment of an example IDS hardware 400 that includes using COTS surface mount components including an ADC 440 that is separate from a microprocessor 420, in accordance with an embodiment of the disclosure. Microprocessor 420 includes I/O hardware 423, IDS algorithm logic 427. ADC 440 is coupled to an RC circuit 460 that is coupled to receive a response signal from DUT 410 when I/O hardware 423 enables an analog switch 480. RC circuit 460 may be the same or similar as the RC circuit described within signal detection circuitry 160. Analog switch 480 may be the same or similar as switch 180.

Figure 5:
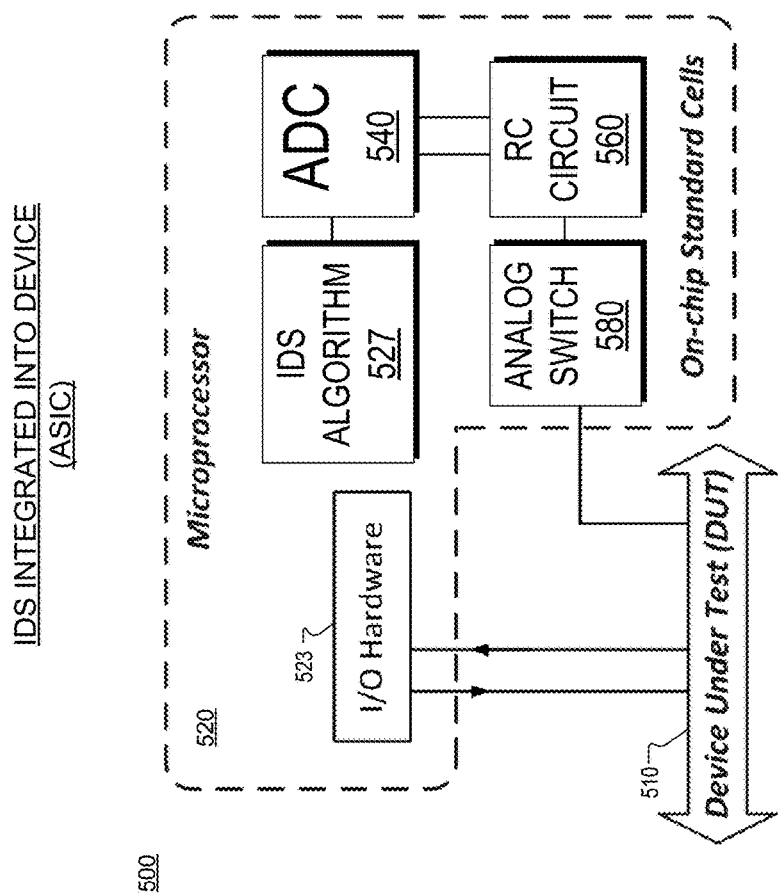
FIG. 5 illustrates an example IDS that includes an Application-Specific Integrated Circuit ("ASIC"), in accordance with an embodiment of the disclosure.

FIG. 5 illustrates yet another embodiment of an example IDS hardware 500 that includes an Application-Specific Integrated Circuit ("ASIC"), in accordance with an embodiment of the disclosure. In some systems, it may make sense because of cost and/or space requirements to integrate the components of the IDS hardware onto a single part, an ASIC. In FIG. 5, the ASIC (or microprocessor 520) includes I/O hardware 523, algorithm logic 527, ADC 540, RC circuit 560, and a switch 580. ADC 540 is coupled to RC circuit 560 that is coupled to receive a response signal from DUT 510 when I/O hardware 523 enables an analog switch 580. RC circuit 560 may be the same or similar as the RC circuit described within signal detection circuitry 160. Analog switch 580 may be the same or similar as switch 180.

Figure 6:
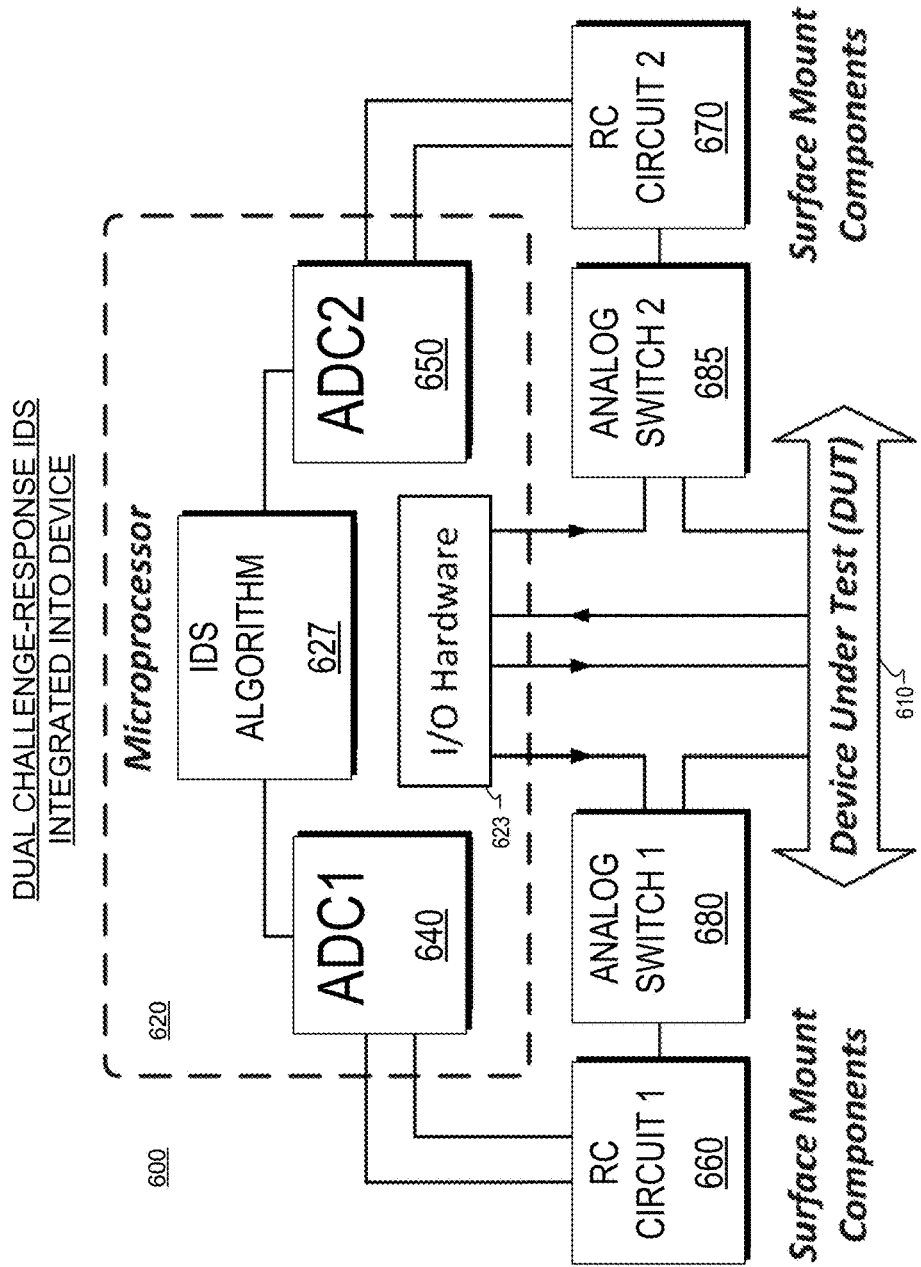
FIG. 6 illustrates an example IDS that is capable of sending at least two challenge signals and is capable of detecting at least two responses, in accordance with an embodiment of the disclosure.

FIG. 6 illustrates yet another embodiment of IDS hardware. Given that a hardware intruder might be one of several types such as another microprocessor, voltage-follower Op-Amp, etc., it can be beneficial to have more than one basic intrusion detection circuit installed in the embedded system as shown in FIG. 6. FIG. 6 illustrates an example IDS 600 that is capable of sending at least two challenge signals and is capable of detecting and characterizing at least two dynamic responses, in accordance with an embodiment of the disclosure. IDS 600 includes a microprocessor 620 that includes I/O hardware 623, IDS algorithm logic 627, and a first ADC1 640 and a second ADC2 650. ADC1 640 is coupled to a first RC circuit 660 that is coupled to receive a first response signal from DUT 610 when I/O hardware 623 enables a first analog switch 680. Similarly, ADC2 650 is coupled to a second RC circuit 670 that is coupled to receive a second response signal from DUT 610 when I/O hardware 623 enables a second analog switch 685. The RC circuits (660 and 670) may be the same or similar as described within signal detection circuitry 160. The analog switches (680 and 685) may be the same or similar as switch 180. Additionally, it is understood that ADC1 and ADC2 may be separate or combined into one physical ADC within microprocessor 620.

Since each of the hardware threat models may have different equivalent circuits, the energy transfer characteristics are expected to be different and might respond better or worse to a variety of induced challenges. Consequently, it may become necessary to install several orthogonal IDS circuits to generate several different electrical signal challenges and provide more intrusion detection coverage to a potential hardware intruder threat. In other words, the RC circuits (or other signal detection circuitry) may be different from each other to detect different characteristics of intruders.

The intrusion detection of the embodiments of FIGS. 1A and 3-6 rely primarily on the physics principle of conservation of energy as described by Kirchhoff's Voltage Law (KVL) and Kirchhoff's Current Law (KCL) which state that the sum of electrical potentials in a closed network is zero (KVL) and that the sum of all current flowing into or out of a node is zero (KCL). In terms of Kirchhoff's laws, a subsystem of the device under test is the closed network, and the point of attachment for a hardware intruder and the IDS circuit is the node described by KCL.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of detecting a hardware intruder of a device under test (DUT), the method performed by an intrusion detection system (IDS) that is coupled to the DUT, the method comprising:
    sending, from the IDS, a challenge signal to the DUT;
    receiving, at a filter circuit of the IDS, a response signal output by the DUT, wherein the response signal is generated by the DUT in response to the challenge signal, the filter circuit comprises a two-stage resistor capacitor circuit, the two-stage resistor capacitor circuit comprises a first capacitor, a first resistor, a second capacitor, and a second resistor, wherein the first capacitor and the second capacitor of the two-stage resistor-capacitor circuit are configured to charge responsive to receipt of the response signal;
    generating response measurements, wherein generating response measurements comprises sampling a voltage of the filter circuit during the charging of the first capacitor and the second capacitor of the two-stage resistor-capacitor circuit;
    determining that the hardware intruder has been coupled to the DUT after manufacture of the DUT, wherein determining that the hardware intruder has been coupled to the DUT comprises comparing the response measurements to previous response measurements, the previous response measurements generated by sampling the voltage of the filter circuit during the charging of the first capacitor and the second capacitor of the two-stage resistor-capacitor circuit responsive to receipt, at the filter circuit, of previous response signals output by the DUT based upon previous challenge signals sent to the DUT, the previous challenge signals sent prior to the challenge signal, wherein the challenge signal and the previous challenge signals are the same signal; and
    responsive to determining that the hardware intruder has been coupled to the DUT, outputting an indication that the hardware intruder is detected.

2. The method of claim 1 further comprising sampling a second voltage of the filter circuit to generate the response measurements.

3. The method of claim 1 wherein outputting the indication that the hardware intruder is detected comprises sending an intruder alert message to a networked utility.

4. The method of claim 1 further comprising limiting the operation of the device responsive to determining that the hardware intruder is present.

5. The method of claim 1, wherein the response signal output by the DUT comprises a binary value.

6. The method of claim 1, wherein the response signal is output by the DUT by way of an integrated circuit communications interface.

7. The method of claim 1, wherein the response signal is output by the DUT by way of an input/output (IO) pin of the DUT.

8. The method of claim 1, wherein the filter circuit has two outputs that are respectively coupled to the first capacitor and the second capacitor of the two-stage resistor-capacitor circuit.

9. The method of claim 1, further comprising:
    discharging the first capacitor and the second capacitor of the two-stage resistor-capacitor circuit after sampling the voltage of the filter circuit;
    re-sampling the voltage of the filter circuit during discharging of the first capacitor and the second capacitor of the two-stage resistor-capacitor circuit to generate second response measurements; and
    analyzing the second response measurements to determine whether the hardware intruder has been coupled to the DUT.

10. A non-transitory machine-accessible storage medium that provides instructions that, when executed by an intrusion detection system (IDS), causes the IDS to perform operations comprising:
    sending a challenge signal to a Device Under Test ("DUT"), wherein the IDS is configured to detect that a malicious circuit has been coupled to the DUT after the DUT has been manufactured;

responsive to receiving, at a filter circuit of the IDS, a response signal that is output by the DUT, sampling a voltage of the filter circuit, wherein the response signal is generated by the DUT in response to the challenge signal, wherein the filter circuit comprises a two-stage resistor-capacitor circuit, wherein a first stage of the two-stage resistor-capacitor circuit comprises a first resistor and a first capacitor, a second stage of the two-stage resistor-capacitor circuit comprises a second resistor and a second capacitor, and further wherein the first capacitor and the second capacitor are configured to charge responsive to receipt of the response signal, the sampling performed during the charging of the first capacitor and the second capacitor to generate response measurements;

determining that the malicious circuit has been coupled to the DUT after the DUT has been manufactured, wherein determining that the malicious circuit has been coupled to the DUT includes comparing the response measurements to previous response measurements, the previous response measurements generated by sampling the voltage of the filter circuit during the charging of the first capacitor and the second capacitor responsive to receipt, at the filter circuit, of previous response signals generated by the DUT in response to the DUT receiving previous challenge signals, the previous challenge signals sent to the DUT prior to the challenge signal being sent to the DUT, wherein the challenge signal and the previous challenge signals are the same signal; and responsive to determining that the malicious circuit has been coupled to the DUT, outputting an indication that the malicious circuit is detected.

11. The non-transitory machine-accessible storage medium of claim 10, further providing instructions that, when executed by the IDS, will cause the IDS to perform further operations, comprising:

sampling a second voltage of the filter circuit to generate the response measurements.

12. The non-transitory machine-accessible storage medium of claim 10, the operations further comprising:

discharging the first capacitor and the second capacitor after sampling the voltage of the filter circuit;

re-sampling the voltage of the filter circuit during discharging of the first capacitor and the second capacitor to generate second response measurements; and analyzing the second response measurements to determine whether the malicious circuit has been coupled to the DUT.

* * * * *